Aug. 31, 1926.

A. ANDERSON

ANIMAL OILER

Filed Nov. 26, 1924

1,597,663

WITNESS:
Gus. Hjelm

INVENTOR:
A. Anderson
BY H.J. Sanders
ATTORNEY.

Patented Aug. 31, 1926.

1,597,663

UNITED STATES PATENT OFFICE.

ANDREW ANDERSON, OF ROCKFORD, ILLINOIS.

ANIMAL OILER.

Application filed November 26, 1924. Serial No. 752,356.

This invention relates to improvements in animal oilers of that type adapted to discharge a certain amount of oil on the back or body of an animal that rubs his body against a portion of the oiler. Means for regulating the flow of oil at each discharge are provided. Means for spreading the oil so that it will be discharged upon the back or body of the animal at several points are provided.

With the foregoing and other objects in view the invention consists in the combination and arrangement of parts to be hereinafter fully described, pointed out in the appended claims and illustrated in the accompanying drawing which forms a part of this application and in which—

Like reference characters denote corresponding parts throughout the several views.

Figure 1:
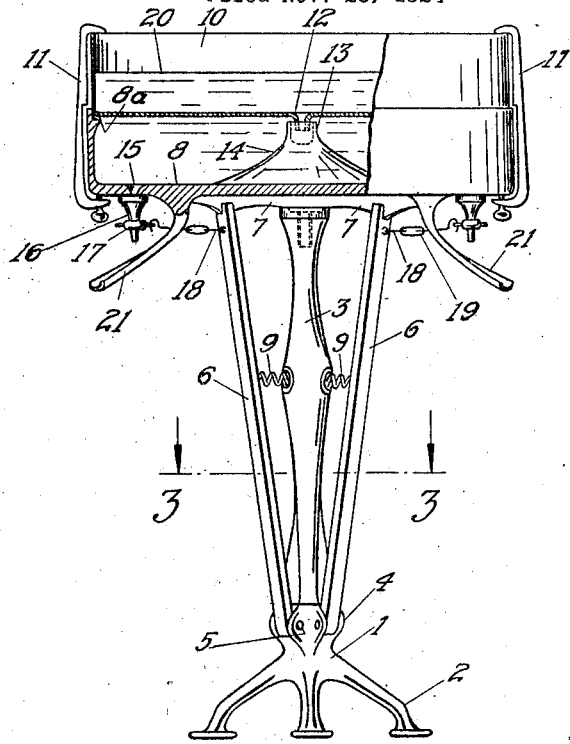
Fig. 1 is a view of the improved animal oiler, in elevation, partly in section to afford a better illustration.
Figure 2:
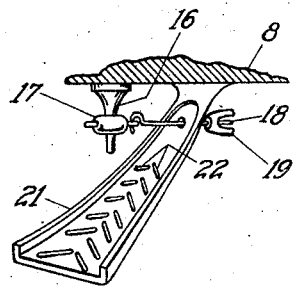
Fig. 2 is an enlarged fragmentary view illustrating the type of discharge faucet and spreader employed.
Figure 3:
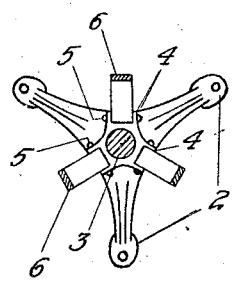
Fig. 3 is a cross section taken on line 3—3 of Fig. 1.

The reference numeral 1 denotes the base supported upon legs 2, said base having a central cavity or socket in which is received one end of the post 3, said base also being formed with the ears 4 that carry the pins 5 upon which the bars 6 are pivotally supported, said bars at their upper ends being grooved for sliding engagement with the ribs 7 formed in the base of the tank 8 that is supported upon the upper end of the said post 3, said bars 6 being connected by springs 9 to the post 3 whereby said post and the several bars 6 are yieldingly spread the maximum distance apart.

A second tank 10 is supported upon the first named tank 8 and securely retained in position by the clamps 11, said tank 10 being formed with an orifice 12 in its base that leads into an overflow cup 13 formed in the apex of a swell 14 formed upon the bottom of the tank 8 which tank is formed with two orifices 15 that open into faucets 16 provided with valves 17 that are opened and closed by wire rods 18 operated by the movement of the said bars 6, said rods 18 being provided with turnbuckles 19 whereby they may be caused to regulate the opening of the said valves. A rubber gasket 8ª separates the tanks and prevents leakage.

Oil 20 is poured into the tank 10 and from the same it flows through the orifice 12 into the cup 13 and out of the same into the tank 8 which may be filled thereby.

Extending downwardly and outwardly from the base of the tank 8 are the spreaders 21 which are trough shaped and which are disposed beneath the faucets 16 to receive the oil therefrom, said spreaders increasing in width as they approach their free ends and being formed with the obliquely disposed ribs 22 which tend to spread the oil over a considerable area as it passes from the spreader to the ground or to the back of the animal.

The animal in rubbing against the oiler encounters one of the bars 6 and presses the same in toward the post 3 thus causing a rod 18 to open a faucet 16 and permit the flow of oil from the tank 8 into the spreader 21 from which it drops upon the animal. The springs 9 will return the bars 6 to normal or inoperative position each time that position is disturbed.

What is claimed is:—

1. In an animal oiler, a base, a post supported thereby, a tank supported upon said post, outlet faucets for said tank, spreaders carried by said tank and extending beneath said faucets, bars pivotally supported by said base and slidably engaging said tank, and connection between said bars and faucets whereby the latter are opened and closed by the sliding movement of said bars.

2. In an animal oiler, a base, a post supported thereby, a tank supported upon said post, bars pivotally supported by said base and slidably engaging said tank, spring connection between said bars and post, outlet faucets for said tank, connection between said bars and faucets whereby the latter are opened and closed by the movement of said bars, and spreaders carried by said tank and disposed beneath said faucets.

3. In an animal oiler, a base, a post supported thereby, a tank supported upon said post, a swell in said tank, a second tank arranged upon said first named tank and formed with an orifice opening into said swell, ribs formed upon the bottom of said first named tank, bars pivotally carried by said base and slidably engaging said ribs, outlet faucets for said first named tank, connection between said faucets and said bars whereby the movement of the latter will operate to open and close said faucets, and spreaders integral with the base of said first named tank and extending downwardly and outwardly therefrom beneath the said faucets.

In testimony that I claim the foregoing as my own I have hereto affixed my signature.

ANDREW ANDERSON.